(12) United States Patent
Kyung et al.

(10) Patent No.: US 7,609,711 B2
(45) Date of Patent: Oct. 27, 2009

(54) COMMUNICATING PROGRAM REJECTION INFORMATION IN BROADCAST-MULTICAST MOBILE COMMUNICATION SYSTEM

(75) Inventors: Chan Ho Kyung, Anyang-si (KR); Jong Hoe An, Seoul (KR); Young Jun Kim, Anyang-si (KR); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 567 days.

(21) Appl. No.: 11/422,013

(22) Filed: Jun. 2, 2006

(65) Prior Publication Data
US 2006/0274775 A1    Dec. 7, 2006

(30) Foreign Application Priority Data
Jun. 3, 2005    (KR) ............... 10-2005-0047654

(51) Int. Cl.
*H04L 12/56*    (2006.01)
(52) U.S. Cl. ..................... 370/432; 370/390
(58) Field of Classification Search ............ 370/312, 370/432, 390
See application file for complete search history.

(56) References Cited

U.S. PATENT DOCUMENTS 5,909,651 A    6/1999    Chander et al.

2004/0228360 A1*  11/2004  Bae et al. .............. 370/432
2005/0111394 A1*  5/2005   Jung et al. ............. 370/312

FOREIGN PATENT DOCUMENTS

WO    WO 2000-065729 A    11/2000
WO    WO 2002-091789 A2   11/2002

\* cited by examiner

*Primary Examiner*—Derrick W Ferris
*Assistant Examiner*—Nihar Patel
(74) *Attorney, Agent, or Firm*—Lee, Hong, Degerman, Kang & Waimey

(57) ABSTRACT

The present invention relates to communicating program rejection information in a broadcast-multicast mobile communication system. Preferably, present invention comprises receiving information related to at least one broadcast-multicast service from a base station, determining to receive one or more specific broadcast-multicast services based on the received information, requesting the one or more specific broadcast-multicast services determined to be received from the base station, and receiving a broadcast reject message for indicating rejection of at least one of the one or more specific broadcast-multicast services requested, wherein the broadcast reject message comprises a same reject reason indicator field for indicating whether a reason for rejecting the at least one of the one or more specific broadcast-multicast services requested is identical to a reason for rejecting a previous broadcast-multicast service in the broadcast reject message.

14 Claims, 3 Drawing Sheets

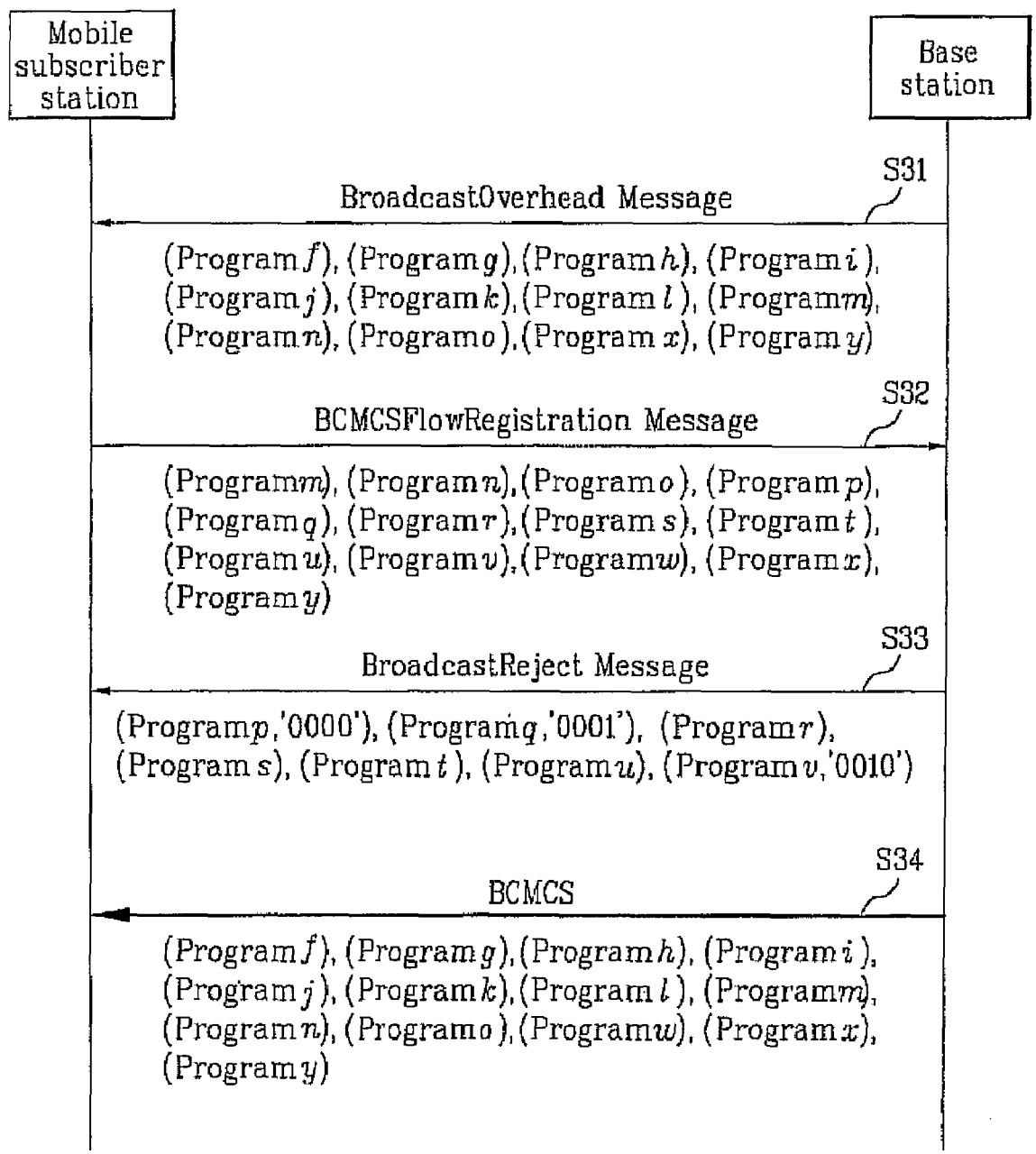

COMMUNICATING PROGRAM REJECTION INFORMATION IN BROADCAST-MULTICAST MOBILE COMMUNICATION SYSTEM

CROSS-REFERENCE TO RELATED APPLICATIONS

Pursuant to 35 U.S.C. §119(a), this application claims the benefit of earlier filing date and right of priority to Korean Application No. P2005-0047654, filed on Jun. 3, 2005 the contents of which are hereby incorporated by reference herein in their entirety.

FIELD OF THE INVENTION

The present invention relates to a method for communicating program rejection information in a broadcast-multicast mobile communication system. Although the present invention is suitable for a wide scope of applications, it is particularly suitable for efficiently communicating rejection information when a broadcast-multicast program requested by a mobile subscriber station is rejected.

BACKGROUND OF THE INVENTION

Generally, in a mobile communication system supporting a broadcast-multicast (BCMC) service, multimedia data such as video and audio should be transmitted. Thus, a BCMC mobile communication system requires a high data rate. In order to perform a BCMC service, a high data rate should be supported by a packet data channel of a physical layer. BCMC data in a current mobile communication system is transmitted via packet data channels of a physical layer presently existing.

If contents to be broadcast are generated from a base station or delivered to the base station from another location, the base station transmits the contents through a radio section using a protocol previously agreed upon between the base station and a mobile subscriber station to enable a plurality of users within the corresponding base station to view or listen to the contents.

A message transmitted between a base station and mobile subscriber stations to perform a BCMC service corresponds to a broadcast overhead message, a broadcast registration message or a broadcast reject message, for example.

The broadcast overhead message is a message that is commonly transmitted to mobile subscriber stations from a base station. The broadcast overhead message contains information enabling a corresponding mobile subscriber station to stably receive a packet data channel or a broadcast channel and perform decoding. For instance, information transmitted via the broadcast overhead message includes information for contents of a BCMC service, information for a channel used for BCMC, mobile subscriber station registration information and the like. The various information are periodically transmitted via the broadcast overhead message. Accordingly, the mobile subscriber station receiving the BCMC service receives the broadcast overhead message.

The broadcast registration message is a message transmitted from a mobile subscriber station to a base station. The broadcast registration message carries information regarding a BCMC service flow to be received by the mobile subscriber station from the base station.

The broadcast reject message is a message transmitted to a mobile subscriber station from a base station in response to the broadcast registration message. The broadcast reject message contains information regarding a rejected BCMC service flow among a plurality of BCMC service flows requested by the mobile subscriber station via the broadcast registration message. Additionally, information indicating that all BCMC service flows requested by the mobile subscriber station are allowed can be transmitted through a specific field value of the broadcast reject message.

Each of the broadcast overhead message, the broadcast registration message and the broadcast reject message includes a FlowDiscriminationCount field. One BCMC service flow has at least one BCMC configuration component flow. Accordingly, the FlowDiscriminationCount field contains information regarding a count of the BCMC configuration component flows configuring one BCMC service.

As mentioned in the foregoing description, the broadcast reject message contains information related to a rejected BCMC service flow among BCMC service flows requested by the mobile subscriber station via the broadcast registration message. However, in the related art, a more efficient BCMC service flow rejecting method for the BCMC service rejection has not been proposed.

SUMMARY OF THE INVENTION

The present invention is directed to communicating program rejection information in a broadcast-multicast mobile communication system that substantially obviates one or more problems due to limitations and disadvantages of the related art.

An object of the present invention is to provide a method of communicating program rejection information in a broadcast-multicast (BCMC) mobile communication system, wherein a rejection reason for a BCMC program request made by a mobile subscriber station is efficiently transmitted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating program rejection information in a broadcast-multicast mobile communication system, the method comprising receiving information related to at least one broadcast-multicast service from a base station, determining to receive one or more specific broadcast-multicast services based on the received information, requesting the one or more specific broadcast-multicast services determined to be received from the base station, and receiving a broadcast reject message for indicating rejection of at least one of the one or more specific broadcast-multicast services requested, wherein the broadcast reject message comprises a same reject reason indicator field for indicating whether a reason for rejecting the at least one of the one or more specific broadcast-multicast services requested is identical to a reason for rejecting a previous broadcast-multicast service in the broadcast reject message.

Preferably, the reason for rejecting the at least one of the one or more specific broadcast-multicast services is omitted from the broadcast reject message if the reason for rejecting the at least one of the one or more specific broadcast-multicast services is identical to the reason for rejecting a previous broadcast-multicast service in the broadcast reject message.

Preferably, the reason for rejecting the at least one of the one or more specific broadcast-multicast services is included in the broadcast reject message if the reason for rejecting the at least one of the one or more specific broadcast-multicast services is not identical to the reason for rejecting a previous broadcast-multicast service in the broadcast reject message.

Preferably, the reason for rejecting the at least one of the one or more specific broadcast-multicast services requested is identical to a reason for rejecting a previous broadcast-multicast service in the broadcast reject message if a value stored in the same reject reason indicator field is 1. Preferably, the reason for rejecting the at least one of the one or more specific broadcast-multicast services is omitted from the broadcast reject message if the value stored in the same reject reason indicator is 1.

Preferably, the reason for rejecting the at least one of the one or more specific broadcast-multicast services requested is not identical to a reason for rejecting a previous broadcast-multicast service in the broadcast reject message if a value stored in the same reject reason indicator field is 0. Preferably, the reason for rejecting the at least one of the one or more specific broadcast-multicast services is included in the broadcast reject message if the value stored in the same reject reason indicator is 0.

Preferably, the same reject reason indicator field has a 1-bit length.

In one aspect of the present invention, a reason for rejecting a broadcast-multicast service comprises at least one of the broadcast-multicast service is unavailable, the broadcast-multicast service is not transmitted, and an authorization signature for the broadcast-multicast service is invalid.

Preferably, the information related to at least one broadcast-multicast service is received via a broadcast overhead message. Preferably, the one or more specific broadcast-multicast services determined to be received from the base station is requested via a broadcast registration message.

In accordance with another embodiment of the present invention, a method for communicating program rejection information in a broadcast-multicast mobile communication system comprises transmitting information related to at least one broadcast-multicast service, receiving a request for one or more specific broadcast-multicast services from a mobile terminal, determining whether to reject at least one of the one or more specific broadcast-multicast services requested by the mobile terminal, checking whether a reason for rejecting the at least one of the one or more specific broadcast-multicast services requested is identical to a reason for rejecting a previous broadcast-multicast service in broadcast reject message if the at least one of the one or more broadcast-multicast services is determined to be rejected, setting a value of a same reject reason indicator field in the broadcast reject message for indicating whether the reason for rejecting the at least one of the one or more specific broadcast-multicast services requested is identical to the reason for rejecting a previous broadcast-multicast service in the broadcast reject message, and transmitting the broadcast reject message to the mobile terminal.

Preferably, the reason for rejecting the at least one of the one or more specific broadcast-multicast services is omitted from the broadcast reject message if the reason for rejecting the at least one of the one or more specific broadcast-multicast services is identical to the reason for rejecting a previous broadcast-multicast service in the broadcast reject message.

Preferably, the reason for rejecting the at least one of the one or more specific broadcast-multicast services is included in the broadcast reject message if the reason for rejecting the at least one of the one or more specific broadcast-multicast services is not identical to the reason for rejecting a previous broadcast-multicast service in the broadcast reject message.

Preferably, the reason for rejecting the at least one of the one or more specific broadcast-multicast services requested is identical to a reason for rejecting a previous broadcast-multicast service in the broadcast reject message if the value stored in the same reject reason indicator field is 1. Preferably, the reason for rejecting the at least one of the one or more specific broadcast-multicast services is omitted from the broadcast reject message if the value stored in the same reject reason indicator is 1.

Preferably, the reason for rejecting the at least one of the one or more specific broadcast-multicast services requested is not identical to a reason for rejecting a previous broadcast-multicast service in the broadcast reject message if the value stored in the same reject reason indicator field is 0. Preferably, the reason for rejecting the at least one of the one or more specific broadcast-multicast services is included in the broadcast reject message if the value stored in the same reject reason indicator is 0.

Preferably, the same reject reason indicator field has a 1-bit length.

In one aspect of the invention, a reason for rejecting a broadcast-multicast service comprises at least one of the broadcast-multicast service is unavailable, the broadcast-multicast service is not transmitted, and an authorization signature for the broadcast-multicast service is invalid.

Preferably, the information related to at least one broadcast-multicast service is transmitted via a broadcast overhead message. Preferably, the request for one or more specific broadcast-multicast services from the mobile terminal is received via a broadcast registration message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3 is a flowchart of a program rejection method in accordance with another embodiment of the present invention.

DETAILED DESCRIPTION OF THE PREFERRED EMBODIMENTS

The present invention relates to communicating program rejection information in a broadcast-multicast mobile communication system.

Reference will now be made in detail to the preferred embodiments of the present invention, examples of which are illustrated in the accompanying drawings. Wherever possible, the same reference numbers will be used throughout the drawings to refer to the same or like parts.

Contents of a broadcast-multicast service (BCMCS) are identified by a BCMCS flow identifier. The BCMCS flow identifier is represented as a BCMCSFlowID within a message. If a BCMCSFlowFormat field is set to "1", the BCMCS flow identifier includes a BCMCS program identifier and a BCMCS flow discriminator. The BCMCS program identifier and the BCMCS flow discriminator are represented as a Program ID field and a FlowDiscriminator field within a message, respectively.

Meanwhile, if the BCMCSFlowFormat field is set to "0", the BCMCS flow identifier is configured regardless of the BCMCS program identifier and the BCMCS flow discriminator.

If the BCMCSFlowFormat field is set to "1", the BCMCS program identifier indicates a specific BCMC program and the BCMCS flow discriminator indicates a specific component configuring a program corresponding to the specific BCMCS program identifier. The BCMCS program identifier can have a length of 16-bit, 24-bit or 32-bit, for example. A length of the BCMCS flow discriminator depends on a value of a FlowDiscriminatorLength field, which may have a value from 0 to 7.

In case of audiovisual programs for example, each of the audiovisual programs can be identified by a corresponding BCMCS program identifier. Meanwhile, each audio and video stream configuring one audiovisual program can be discriminated by a corresponding BCMCS flow discriminator.

Figure 1:
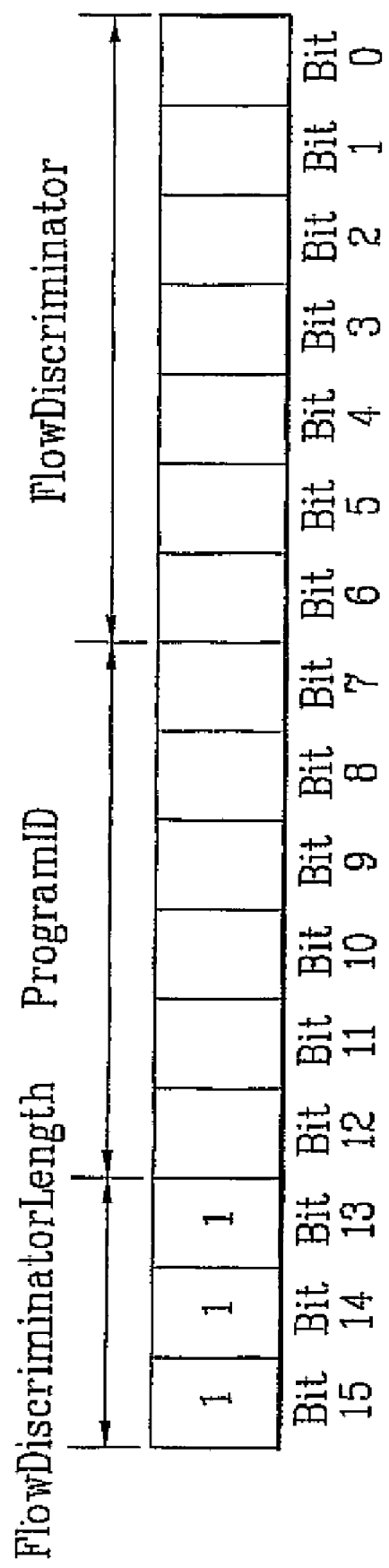
FIG. 1 is a diagram of a broadcast-multicast (BCMC) service flow identifier in accordance with one embodiment of the present invention.

FIG. 1 is a diagram of a BCMCS flow identifier in accordance with one embodiment of the present invention, wherein a BCMCS flow identifier having a 16-bit length is shown.

Referring to FIG. 1, a BCMCS flow identifier includes a FlowDiscriminatorLength field indicating a BCMCS flow discriminator, a ProgramID field indicating a BCMCS program identifier and a FlowDiscriminator field indicating a BCMCS flow discriminator.

The FlowDiscriminatorLength field, which has a 3-bit length, can have a value between "000" to "111". As mentioned above, a length of the FlowDiscriminator field depends on a value of the FlowDiscriminatorLength field.

For example, if a FlowDiscriminatorLength field is set to "000"; a FlowDiscriminator field does not exist ($0\times2^2+0\times2^1+0\times2^0=0$). However, if a FlowDiscriminatorLength field is set to "111" ("111"=$1\times2^2+1\times2^1+1\times2^0$), a FlowDiscriminator field has a 7-bit length ($1\times2^2+1\times2^1+1\times2^0=7$).

Meanwhile, a length of the ProgramID field can be determined by Formula 1.

ProgramID field length=ProgramID field length–
  FlowDiscriminator field length–FlowDiscriminatorLength field length     [Formula 1]

If the FlowDiscriminatorLength field value is "111" as illustrated in FIG. 1, i.e., if a length of the FlowDiscriminator field is 7-bit, there can exist 128 ($2^7$=128) different BCMCS flow discriminators corresponding to one BCMCS program identifier.

Meanwhile, if there exists only one component flow configuring a BCMCS program, a FlowDiscriminatorLength field value is set to "000", and a BCMCS flow can be identified by a ProgramID field indicating the BCMCS program. Within one service provider's network, lengths of BCMCFlowID and FlowDiscriminator fields for a given program can be fixed instead of varying according to flows. Because the FlowDiscriminatorLength field value is "000", the present invention is applicable to a case where a BCMC flow is identified by the Program ID.

Figure 2:
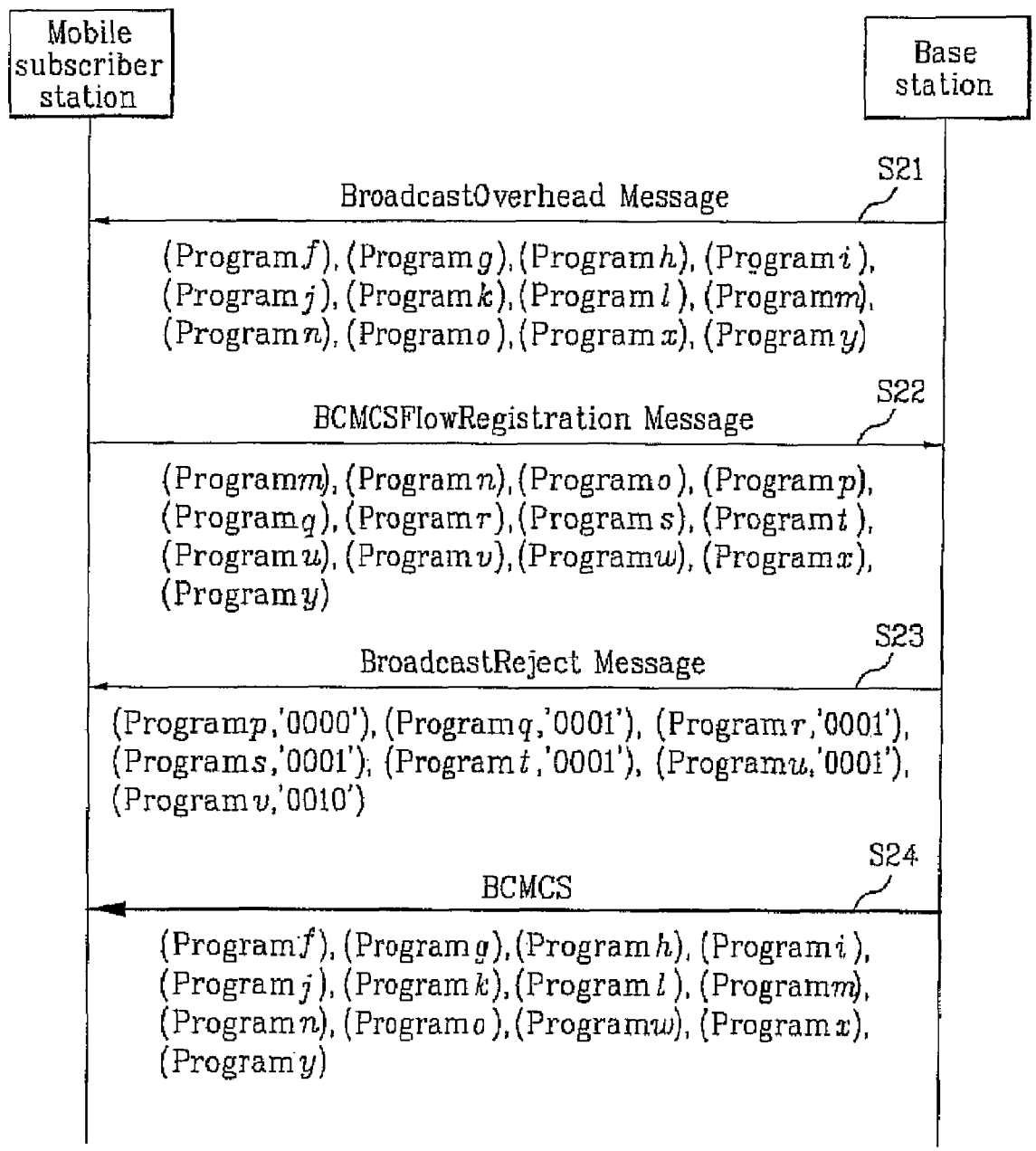
FIG. 2 is a flowchart of a program rejection method in accordance with one embodiment of the present invention.

FIG. 2 is a flowchart of a program rejection method in accordance with one embodiment of the present invention. Referring to FIG. 2, a base station periodically transmits information regarding a type of BCMC service (BCMCS) currently available via a broadcast overhead message [S21]. As illustrated in FIG. 2, the base station preferably transmits twelve BCMCS flows comprising Programf, Programg, Programh, Programi, Programj, Programk, Programl, Prmgramm, Prmgramn, Programo, Programx and Programy.

A mobile subscriber station receives the broadcast overhead message and decides to receive a specific BCMCS based on the received overhead message. The mobile subscriber station then transmits the reception decision to the base station [S22]. Preferably, information regarding the specific BCMCS is transmitted to the base station via a broadcast registration message (BCMCSFlowRegistration Message). As illustrated in FIG. 2, the mobile subscriber station preferably requests thirteen BCMCS flows including Programm, Programn, Programo, Programp, Programq, Programr, Programs, Programt, Programu, Programv, Programw, Programx and Programy.

Having received the broadcast registration message from the mobile subscriber station, the base station transmits information regarding an unavailable BCMCS flow among the requested BCMC services [S23]. Preferably, information for the unavailable BCMCS flow the base station cannot provide is transmitted via a broadcast reject message (BroadcastReject Message). Accordingly, the base station transmits information regarding a reason why each BCMCS flow is rejected as well as a type of the rejected BCMCS flow.

Table 1 shows an example of a BCMCS flow reject reason.

TABLE 1

| Value | ProgramRejectReason |
|---|---|
| 0000 | BCMCS Flow ID not available |
| 0001 | BCMCS Flow ID not transmitted |
| 0010 | Invalid authorization signature |

Referring to Table 1, if a value of a ProgramRejectReason field indicating a service reject reason is set to "0000", a corresponding BCMCS flow is unavailable. If a value of the ProgramRejectReason field set to "0001", a corresponding BCMCS flow is not transmitted. If a value of the ProgramRejectReason field set to "0010", an authorization signature for a corresponding BCMCS is invalid.

As illustrated in FIG. 2, the following assumptions are effective. First, Programp is rejected because a corresponding BCMCS flow is unavailable (ProgramRejectionReason="0000"). Furthermore, Programq, Programr, Programs, Programt and Programu are rejected because corresponding BCMCS flows are not transmitted (ProgramRejectionReason="0001"). Finally, Programv is rejected because an authorization signature for a corresponding BCMCS flow is not valid (ProgramRejectionReason="0010").

Hence, the substantially serviced BCMCS flows are Programf, Programg, Programh, Programi, Programj, Programk, Programl, Programm, Programn, Programo, Programx and Programy (S24).

FIG. 3 is a flowchart of a program rejection method in accordance with another embodiment of the present invention. Referring to FIG. 3, a base station periodically transmits information for a type of BCMC service (BCMCS) currently available via a broadcast overhead message [S31]. As illustrated in FIG. 3, the base station preferably transmits twelve BCMCS flows including Programf, Programg, Programh, Programi, Programj, Programk, Programl, Prmgramm, Prmgramn, Programo, Programx and Programy.

A mobile subscriber station receives the broadcast overhead message and decides to receive a specific BCMCS based on the received overhead message. The mobile subscriber station then transmits the reception decision to the base station [S32]. Preferably, information regarding the specific BCMCS is transmitted to the base station via a broadcast registration message (BCMCSFlowRegistration Message). As illustrated in FIG. 3, the mobile subscriber station preferably requests thirteen BCMCS flows including Programm, Programn, Programo, Programp, Programq, Programr, Programs, Programt, Programu, Programv, Programw, Programx and Programy.

Having received the broadcast registration message from the mobile subscriber station, the base station transmits information regarding an unavailable BCMCS flow among the requested BCMC services [S33]. Preferably, information regarding the unavailable BCMCS flow the base station cannot provide is transmitted via a broadcast reject message (BroadcastReject Message).

As illustrated in FIG. 3, the following assumptions are effective. First, Programp is rejected because a corresponding BCMCS flow is unavailable. Furthermore, Programq, Programr, Programs, Programt and Programu are rejected because corresponding BCMCS flows are not transmitted. Finally, Programv is rejected because an authorization signature for a corresponding BCMCS flow is not valid.

Referring to Table 1, in the broadcast reject message, a ProgramRejectReason field value for Programp is "0000". Moreover, a ProgramRejectReason field value for Programq, Programr, Programs, Programt or Programu is "0001". Finally, a ProgramRejectReason field value for Programv is "0010".

As mentioned in the foregoing description, because the types of BCMC reject reasons are limited, it is probable that the reject reasons for the respective BCMCS flows in rejecting a program may be overlapped. In accordance with the present invention, information for the reject reasons can be more efficiently transmitted without transmitting the reject reasons for the respective BCMCS flows individually. This may be accomplished by utilizing a same reject reason indicator field (RejectSameAsPreviousProgram) for indicating that a reject reason is identical to that of a previous program transmitted via a broadcast reject message (BroadcastReject Message). Preferably, the same reject reason indicator field is utilized instead of a program reject reason field (ProgramRejectReason).

Preferably, if a reject reason for a specific BCMCS flow is identical to that of a previous BCMCS flow, the base station is able to indicate that the reject reason for the specific BCMCS flow is identical to that of the previous BCMCS flow by setting the RejectSameAsPreviousProgram field in the broadcast reject message to a specific value (e.g., 1). Accordingly, if the reject reason for the specific BCMCS flow is identical to that of the previous BCMCS flow, a message size can be reduced by setting a value of the RejectSameAsPreviousProgram field having a 1-bit length within the broadcast reject message and omitting the 4-bit ProgramRejectReason field.

Table 2 shows an example of a broadcast reject message (BroadcastReject) in part.

TABLE 2

| | |
|---|---|
| ProgramCount | 6 |
| ProgramCount occurrences of the remaining fields (except the Reserved field): | |
| ProgramIDLSBLength | 5 |
| ProgramIDLSBs | ProgramIDLSBLength |
| FlowDiscriminatorCount | 6 |
| FlowdiscriminatorLength | 0 or 3 |
| RejectSameAsPreviousProgram | 0 or 1 |
| ProgramRejectReason | 0 or 4 |
| FlowDiscriminatorCount occurrences of the following three fields: | |
| FlowDiscriminator | FlowDiscriminatorLength |
| RejectSameAsPreviousFlow | 1 |
| FlowRejectReason | 0 or 4 |
| Reserved | 0~7 (if needed) |

As shown in the example of Table 2, a broadcast reject message (BroadcastReject Message) according to one embodiment of the present invention includes a same reject reason indicator field (RejectSameAsPreviousProgram) indicating whether a BCMCS flow reject reason is identical to that of a previous BCMCS flow.

The RejectSameAsPreviousProgram field can be included in the broadcast reject message (BroadcastReject Message) if a BCMCSFlowFormat field value is "1" and if a FlowDiscriminatorCount field value is "000000". Otherwise, the RejectSameAsPreviousProgram field can be omitted. When the BCMCSFlowFormat field value is "1", then the BCMCSFlowID is determined by the ProgramID, i.e., the FlowDiscriminatorCount field value is "000000".

An example of a method for setting a same reject reason indicator (RejectSameAsPreviousProgram) field indicating whether a reject reason is identical to that of a previous BCMCS flow in a broadcast reject message (BroadcastReject Message) is explained in detail as follows.

First, a value of a same reject reason indicator field (RejectSameAsPreviousProgram) for a first BCMCS flow of a broadcast reject message is set to "0". Then, for a different BCMCS flow not corresponding to the first, it is checked whether a reject reason of the corresponding BCMCS flow is identical to that of a previous BCMCS flow.

As a result of the check, if the reject reasons are not identical to each other, the value of the same reject reason indicator field (RejectSameAsPreviousProgram) of the corresponding BCMCS flow is set to "0" and a value of a ProgramRejectReason field is set according to the reject reason of the corresponding BCMCS flow.

Meanwhile, if the reject reasons are identical to each other, the value of the same reject reason indicator field (RejectSameAsPreviousProgram) for the corresponding BCMCS flow is set to "1" and the ProgramRejectReason field for the corresponding BCMCS flow is omitted.

If the reject reason for the corresponding BCMCS flow is identical to that of the previous BCMCS flow, the value of the same reject reason indicator field (RejectSameAsPreviousProgram) can be set to "0". Otherwise, the value of the same reject reason indicator field (RejectSameAsPreviousProgram) can be set to "1".

Consequently, referring to FIG. 3, because each of the program reject reasons corresponding to Programr, Programs, Programt and Programu are identical to that of Programq in the broadcast reject message, the value of the same reject reason indicator field (RejectSameAsPreviousProgram) corresponding to each of the Programr, Programs, Programt and Programu are set to "1" and a value of the ProgramRejectReason field can be omitted. Accordingly, in case that a BCMCS flow requested by a mobile subscriber station is rejected, the present invention can efficiently transmit information for the broadcast rejection.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for communicating program rejection information in a broadcast-multicast mobile communication system, the method comprising:
   a mobile station receiving information related to at least one broadcast-multicast service from a base station;
   the mobile station determining to receive one or more specific broadcast-multicast services based on the received information;
   the mobile station requesting the one or more specific broadcast-multicast services determined to be received from the base station; and
   the mobile station receiving a broadcast reject message for indicating rejection of at least one of the one or more specific broadcast-multicast services requested;
   wherein the broadcast reject message comprises a same reject reason indicator field for indicating whether a reason for rejecting the at least one of the one or more specific broadcast-multicast services requested is identical to a reason for rejecting a previous broadcast-multicast service in the broadcast reject message,
   wherein the reason for rejecting the at least one of the one or more specific broadcast-multicast services requested is identical to a reason for rejecting a previous broadcast-multicast service in the broadcast reject message if a value stored in the same reject reason indicator field is 1,
   wherein the reason for rejecting the at least one of the one or more specific broadcast-multicast services requested is not identical to a reason for rejecting a previous broadcast-multicast service in the broadcast reject message if a value stored in the same reject reason indicator field is 0.

2. The method of claim 1, wherein the reason for rejecting the at least one of the one or more specific broadcast-multicast services is omitted from the broadcast reject message if the value stored in the same reject reason indicator is 1.

3. The method of claim 1, wherein the reason for rejecting the at least one of the one or more specific broadcast-multicast services is included in the broadcast reject message if the value stored in the same reject reason indicator is 0.

4. The method of claim 1, wherein the same reject reason indicator field has a 1-bit length.

5. The method of claim 1, wherein a reason for rejecting a broadcast-multicast service comprises at least one of:
   the broadcast-multicast service is unavailable;
   the broadcast-multicast service is not transmitted; and
   an authorization signature for the broadcast-multicast service is invalid.

6. The method of claim 1, wherein the information related to at least one broadcast-multicast service is received via a broadcast overhead message.

7. The method of claim 1, wherein the one or more specific broadcast-multicast services determined to be received from the base station is requested via a broadcast registration message.

8. A method for communicating program rejection information in a broadcast-multicast mobile communication system, the method comprising: transmitting information related to at least one broadcast-multicast service;
   a base station receiving a request for one or more specific broadcast-multicast services from a mobile terminal;
   the base station determining whether to reject at least one of the one or more specific broadcast-multicast services requested by the mobile terminal;
   the base station checking whether a reason for rejecting the at least one of the one or more specific broadcast-multicast services requested is identical to a reason for rejecting a previous broadcast-multicast service in broadcast reject message if the at least one of the one or more broadcast-multicast services is determined to be rejected;
   the base station setting a value of a same reject reason indicator field in the broadcast reject message for indicating whether the reason for rejecting the at least one of the one or more specific broadcast-multicast services requested is identical to the reason for rejecting a previous broadcast-multicast service in the broadcast reject message; and
   the base station transmitting the broadcast reject message to the mobile terminal,
   wherein the reason for rejecting the at least one of the one or more specific broadcast-multicast services requested is identical to a reason for rejecting a previous broadcast-multicast service in the broadcast reject message if the value stored in the same reject reason indicator field is 1,
   wherein the reason for rejecting the at least one of the one or more specific broadcast-multicast services requested is not identical to a reason for rejecting a previous broadcast-multicast service in the broadcast reject message if the value stored in the same reject reason indicator field is 0.

9. The method of claim 8, wherein the reason for rejecting the at least one of the one or more specific broadcast-multicast services is omitted from the broadcast reject message if the value stored in the same reject reason indicator is 1.

10. The method of claim 8, wherein the reason for rejecting the at least one of the one or more specific broadcast-multicast services is included in the broadcast reject message if the value stored in the same reject reason indicator is 0.

11. The method of claim 8, wherein the same reject reason indicator field has a 1-bit length.

12. The method of claim 8, wherein a reason for rejecting a broadcast-multicast service comprises at least one of:
   the broadcast-multicast service is unavailable;
   the broadcast-multicast service is not transmitted; and
   an authorization signature for the broadcast-multicast service is invalid.

13. The method of claim 8, wherein the information related to at least one broadcast-multicast service is transmitted via a broadcast overhead message.

14. The method of claim 8, wherein the request for one or more specific broadcast-multicast services from the mobile terminal is received via a broadcast registration message.

* * * * *